Feb. 3, 1970  A. N. WRIGHT ET AL  3,493,352
MAGNETO OPTICAL DISPLAY DEVICE WITH LAYERS
NICKEL-CHROMIUM AND GOLD
Filed Dec. 1, 1966

Inventors:
Archibald N. Wright,
Virginia F. Meikleham,
by Paul R. Webb, II
Their Attorney.

United States Patent Office 3,493,352
Patented Feb. 3, 1970

3,493,352
MAGNETO OPTICAL DISPLAY DEVICE WITH LAYERS NICKEL-CHROMIUM AND GOLD
Archibald N. Wright, Schenectady, and Virginia F. Meikleham, Syracuse, N.Y., assignors to General Electric Company, a corporation of New York
Filed Dec. 1, 1966, Ser. No. 598,363
Int. Cl. B21d *39/00;* B23p *3/00*
U.S. Cl. 29—183.5                            1 Claim

---

ABSTRACT OF THE DISCLOSURE

This invention relates to a magneto optical device comprising a composite stock in which a nickel chromium layer is secured to an insulating base, a layer of gold is coated on the nickel chromium alloy iron, nickel layer is secured to the gold layer, an insulating coat is placed on top of the nickel iron layer and aqueous coating is placed on the insulating coat.

---

This invention relates to magneto optical display devices and more particulary to magneto optical display devices which are provided with a continuous film formed by ultraviolet surface photopolymerization of tetrafluoroethylene in the gaseous phase on the magnetic film thereof.

A conventional type of magneto optical display device has an electrically insulating glass substrate with a thickness of about 3 mils, sputtered layers of Nichrome and gold on the surface of the substrate, an electroplated nickel-iron magnetic film on the upper surface of the gold layer, Bitter solution on the nickel-iron magnetic film, and a 50 mils thick cover glass over the Bitter solution, which cover glass is sealed to the glass substrate. Bitter solution is magnetite iron oxide, $Fe_3O_4$, in an aqueous suspension to which has been added a stabilizer, such as dodecylamine acetate. Such a device is useful as an optical display or visual readout produced by magnetic influence from the magnetic film. However, the Bitter solution corrodes the nickel-iron magnetic film resulting in a limited time period of operation for the device.

It would be desirable to provide such a device in which the corrosion was eliminated or reduced substantially. If a coating or film is employed between magnetic film and the Bitter solution it must be impervious to water, mild acids and alkalis. Further, such a coating or film must be thin enough to reveal the details of the domain wall patterns in the magnetic film. In attempts to solve these problems, a gold film with a thickness of 200 angstroms has been used between the magnetic film and the Bitter solution, the magnetically active layers in the device. Such a film appears to eliminate the corrosion problem. However, the gold film changes the color and brightness ratio of the device.

Our invention is directed to an improved magneto optical display device in which a film is employed between its magnetically active layers, which film eliminates corrosion, exhibits the desired thinness, and does not affect adversely the color or brightness ratio. Such a film, which is thin, imperforate and continuous, is formed by ultraviolet surface photopolymerization of tetrafluoroethylene in the gaseous phase. In copending application, Ser. No. 530,971 filed Mar. 1, 1966, which application is assigned to the same assignee as the present application, there is disclosed and claimed films, coatings, and products including such films and coatings by ultraviolet surface photopolymerization of various materials in the gaseous phase including tetrafluoroethylene.

While tetrafluoroethylene has been polymerized by conventional means, this material has not been polymerized by ultraviolet surface photopolymerization from a gaseous phase. Further, this material has not been found previously to be a unique, adhesive, thin, imperforate, continuous film for a magneto optical display device.

It is an object of our invention to provide an improved magneto optical display device.

It is another object of our invention to provide an improved magneto optical display device which has an adherent, thin, imperforate, continuous film between the magnetically active film and layer.

It is a further object of our invention to provide an improved magneto optical display device in which the continuous film is formed by ultraviolet surface photopolymerization of tetrafluoroethylene in the gaseous phase.

It is a further object of our invention to provide an improved magneto optical display device in which the continuous film is less than 1,000 angstroms in thickness.

In accordance with our invention, a magneto optical display device can be formed which has an electrically insulating substrate, a nickel-iron film adhering to a surface of the substrate, a thin, imperforate continuous film of less than 1,000 angstroms in thickness adhering to the surface of the magnetic film, the continuous film formed by ultraviolet surface photopolymerization of tetrafluoroethylene in the gaseous phase. Bitter solution on the surface of the continuous film, and a transparent cover over the Bitter solution and sealed to the substrate.

These and various other objects, features, and advantages of the invention will be better understood from the following description taken in connection with the accompanying drawing in which.

Figure 1:
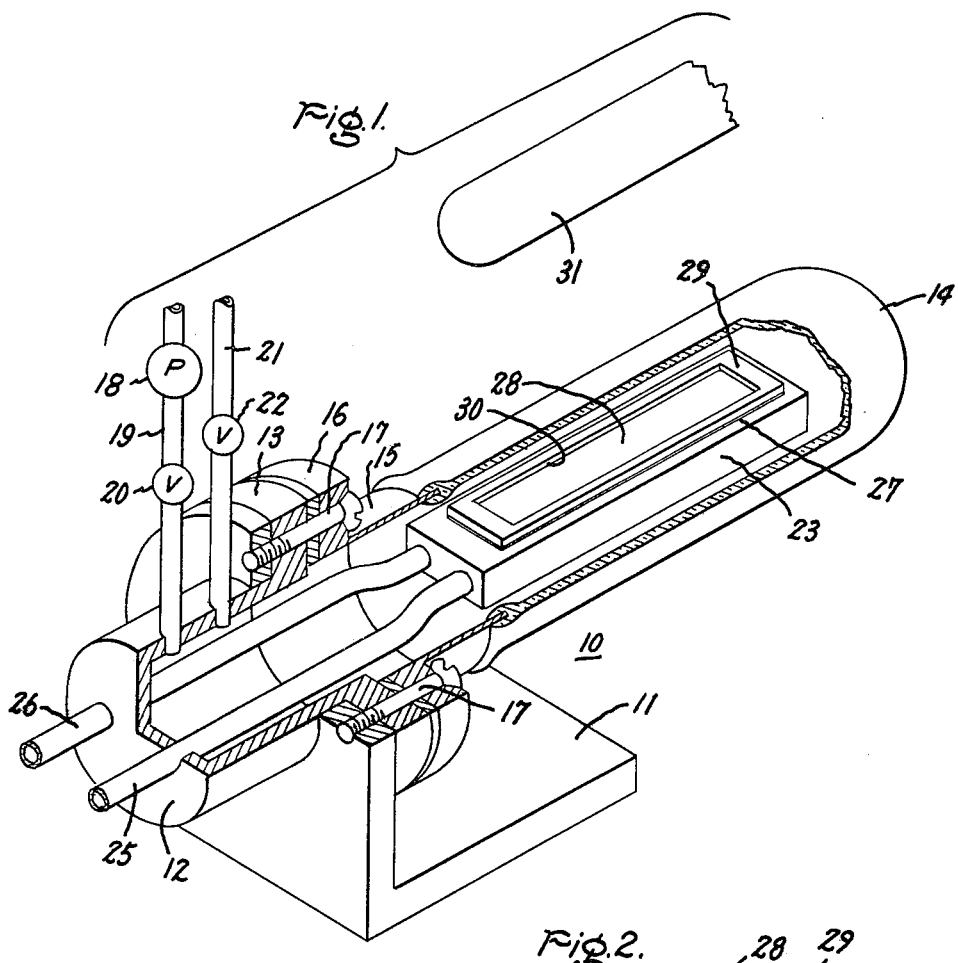
FIGURE 1 is a perspective view partially in section of an apparatus for forming adherent, thin, imperforate, continuous films on nickel-iron magnetic films to provide a magneto optical display device.

In FIGURE 1 of the drawing, apparatus is shown generally at 10 for forming adherent, thin, imperforate, continuous films on the surfaces of magnetic films for producing magneto optical display devices in accordance with our invention. A base or support surface (not shown) is provided on which is mounted an L-shaped bracket 11 to support enclosure or chamber 12 having a flange 13 at its open end. A quartz tube 14 is bonded adjacent at its open end by any suitable metal-ceramic seal to a metal cylinder 15 having a flange 15 at its opposite end. Flange 16 is readily threaded to and unthreaded from flange 13 of enclosure 12 by means of a plurality of threaded fasteners 17. A vacuum pump 18 is connected by a line 19 to enclosure 12 to evacuate the latter and associated quartz tube 14. A control valve 20 is provided in evacuation line 19. An inlet line 21 is connected at one end to enclosure 12 and at its other end to a source (not shown) of tetrafluoroethylene to be supplied in gaseous state to tube 14. A control valve 22 is provided in line 21 to control the supply of tetrafluoroethylene to enclosure 12 and tube 14.

A support block 23 of material such as copper, as shown, is positioned within tube 14. Block 23 has an U-shaped metal tube 24 imbedded therein, two ends 25 and 26 of which extend through cylinder 15, flanges 16 and 23, enclosure 12 and through the wall of the latter. Tube 24 circulates a cooling medium such as ethanol to block 23 and positions the block. The ends 25 and 26 of tube 24 are connected to a heat exchanger or to other cooling equipment. An electrically insulating substrate 27 in the form of a glass substrate is shown positioned on support block 23. The nickel-iron magnetic film 28 is provided on layers of Nichrome and gold (not shown) which have been sputtered on substrate 27. A stainless steel light mask 29, which is shown as the same size as substrate 27, has a slot 30 therethrough to provide formation of a predetermined patterned thin, imperforate, continuous film on magnetic film 28.

An ultraviolet light 31, which is normally provided with a reflector (not shown), is shown outside and spaced about quartz tube 14 and supported in any suitable manner. Such a light source provided ultraviolet light in a region of about 2,000 angstroms to 3,500 angstroms, which is directed by the reflector (not shown) towards the upper surface of magnetic film 28. For example, an Hanovia 700 watt lamp with a reflector will provide this particular light region. A metal enclosure with a door, which is not shown, is positioned around the above apparatus during its operation.

Figure 2:
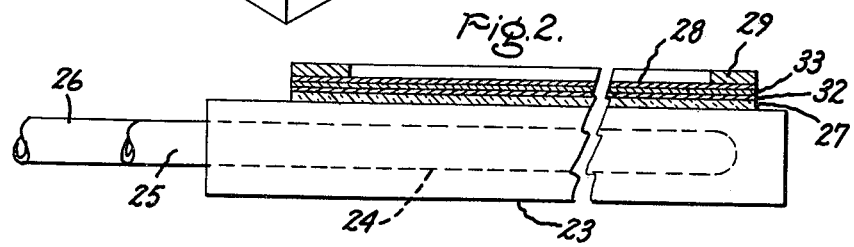
FIGURE 2 is an enlarged side elevational view partially in section of a portion of the apparatus shown in FIGURE 1.

In FIGURE 2 of the drawing, an enlarged side elevational view is shown of support block 23 which was described above in connection with FIGURE 1 of the drawing. Block 23 has an U-shaped tube 24 imbedded therein, the two ends 25 and 26 of which circulate a cooling medium to and from block 23, respectively. Substrate 27, Nichrome layer 32, gold layer 33, magnetic film 28 and light mask 29 are shown partially in section to disclose more clearly the apparatus. While a single slot 30 is described for light mask 29, a plurality of slots may be employed or a plurality of coated substrates can be used.

In FIGURES 1 and 2, substrate 27 is formed of a material such as glass, or a glazed ceramic, which substrate provides a smooth surface for subsequent deposit of materials thereon. Nichrome layer 32 and gold layer 33 are sputtered on the upper surface of substrate 27 to provide adherence for magnetic film 28 which is electroplated thereon from a Watts type plating solution. The magnetic film is composed of a nickel-iron alloy, which has 80 weight percent nickel and the balance of iron.

Figure 3:
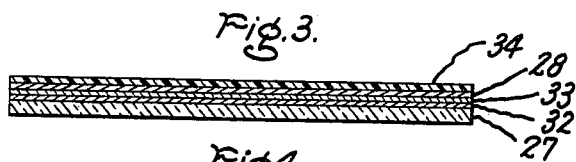
FIGURE 3 is a sectional view of an electrically insulating substrate with Nichrome, gold, and nickel-iron films and with a continuous film thereon formed in accordance with our invention.

In FIGURE 3 of the drawing, there is shown in section glass substrate 27 with a Nichrome layer 32, a gold layer 33, a nickel-iron magnetic film 28, and a thin, imperforate, continuous film 34 adhering firmly to the upper surface of film 28. Film 34 is formed on the surface of film 28 in the apparatus shown in FIGURE 1 of the drawing.

Figure 4:
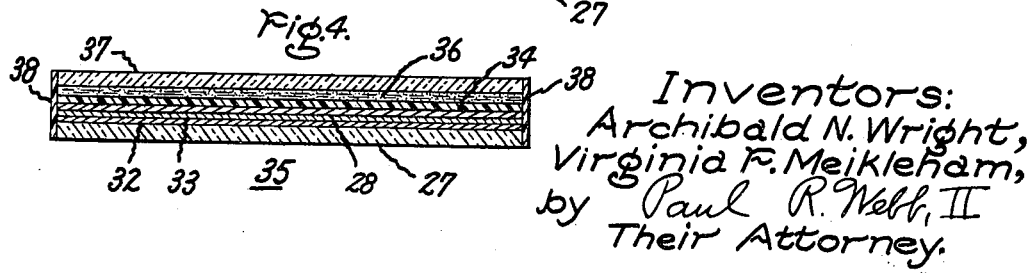
FIGURE 4 is a sectional view of an improved magneto-optical display device embodying our invention.

In FIGURE 4 of the drawing, there is shown in section a magneto-optical display device 35 which has a glass substrate 27, a Nichrome layer 32, a gold layer 33, a thin, imperforate, continuous insulating film 34 adhering firmly to the upper surface of magnetic film 28, Bitter solution 36, a cover glass 37, and a sealant 38. Film 34 is formed on the upper surface of film 28 in the apparatus shown in FIGURE 1 of the drawing. Bitter solution 36 is applied dropwise to the upper surface of film 34 and spread evenly by means of cover glass 37. A sealant or paint 38 seals cover glass 37 to substrate 27.

We have found unexpectedly that a superior magneto optical display device could be formed if a thin, imperforate, continuous film of a thickness less than 1,000 angstroms is formed on the magnetic film in the manner described above. We have found also that the above thin, imperforate, continuous films could be deposited configurationally, formed a strong, adhesive bond with the surface of the magnetic film, were stable at operating temperatures, prevented corrosion of the magnetic film, and retain the color and brightness ratio of the device.

In an illustrative operation of the apparatus shown in FIGURE 1 of the drawing, glass substrate 27 was positioned on copper support block 23. Substrate 27 had a Nichrome layer 32, a gold layer 33 and a nickel-iron magnetic film 28 of 30,000 angstroms thickness thereon. While a magneto optical display device will show color with film 28 in a thickness range from 15,000 to 100,000 angstroms, maximum brightness is obtained with a film thickness of 30,000 angstroms. A stainless steel light mask 29 with a single slot therein was placed on the upper surface of magnetic film 28. Quartz tube 14 was then attached by its flange 16 to flange 13 of enclosure 12 by means of threaded fastener 17. Vacuum pump 18 was started and pumped down the chamber defined by tube 14, cylinder 15, and enclosure 12 to a pressure of about 1 micron. Valve 20 was then closed. Tetrafluoroethylene was supplied from a liquid source (not shown) through line 21 in a gaseous state to enclosure 12 whereby it was fed into the interior of quartz tube 14. The above material was initially retained in its liquid state by maintaining its temperature below room temperature which is accomplished by employing a cooling bath surrounding the liquid materials. The liquid is maintained at a vapor pressure in the range of 1 to 3 millimeters of mercury by the cooling bath which is at a temperature of about −137° C. whereby the introduction of the monomer from the source to the inlet line is in a gaseous state. Block 23 is cooled so that the substrate temperature is maintained in a range from 0° to 30° C. Ultraviolet lamp 31, having an effective wave length in the range of 2,000 to 3,500 angstroms, was positioned above quartz tube 14 and spaced approximately two inches from the upper surface of magnetic film 28.

The monomer was introduced into quartz tube 14 causing a rise in the pressure. A metal hood (not shown) was positioned around apparatus 10 since an ultraviolet light source is used. Lamp 31 was turned on. After a period of time, lamp 31 was shut off, monomer valve 22 was closed, and the system was pumped down to about 1 micron pressure to remove all by-products. The metal hood was removed and the vacuum was then broken. Block 23 was warmed to room temperature and tube 14 was disconnected by unthreading fasteners 17 which held its associated flange 16 to flange 13. After tube 14 was removed, metal light mask 28 was removed. Examination of magnetic film 28 on substrate 27 showed that an adherent, thin, imperforate, continuous film 34 had been formed on the upper surface of magnetic film 28.

Such a film 34 on magnetic film 28 as described above is shown in FIGURE 3 of the drawing.

In FIGURE 4 of the drawing, there is shown a magneto optical display device 35 made in accordance with our invention. Device 35 has a glass substrate 27, a Nichrome film 32, a gold film 33, a nickel-iron magnetic film 28, a thin, imperforate, continuous film 34 on the magnetic film 28, Bitter solution 36 on film 34, a cover glass 37, and a sealant 38.

Examples of magneto optical display devices made in accordance with our invention are set forth below. In each of these examples, the apparatus of FIGURE 1 was employed as described above to provide a thin, imperforate, continuous film deposited from monomeric tetrafluoroethylene in the gaseous phase adhering firmly to a nickel-iron magnetic film having a preferred thickness of about 30,000 angstroms. The magnetic film was deposited initially by electroplating onto the glass substrate. Prior to the formation of the thin, imperforate, continuous film, the chamber in FIGURE 1 was evacuated initially to a pressure of one micron. Subsequently, Bitter solution was applied to the thin, imperforate, continuous film. A cover glass was placed over the Bitter solution and the cover glass was sealed to the glass substrate to complete the device. Table I sets forth the conditions to provide the thin, imperforate, continuous films, where the average substrate temperature in each instance was 12° C.

TABLE I

| Example No. | Vapor pressure, mm. Hg | Process time, minutes |
|---|---|---|
| 1 | 4.0 | 7 |
| 2 | 4.0 | 7 |
| 3 | 4.0 | 7 |
| 4 | 4.0 | 13 |
| 5 | 4.0 | 13 |
| 6 | 4.0 | 13 |
| 7 | 4.0 | 60 |
| 8 | 4.0 | 88 |
| 9 | 2.0 | 20 |
| 10 | 2.0 | 20 |

TABLE II

| Example No. | Average film thickness, Angstroms | Operative |
|---|---|---|
| 1 | 210 | Yes |
| 2 | 210 | Yes |
| 3 | 210 | Yes |
| 4 | 390 | Yes |
| 5 | 390 | Yes |
| 6 | 390 | Yes |
| 7 | 1,200 | No |
| 8 | 1,760 | No |
| 9 | 400 | Yes |
| 10 | 400 | Yes |

In above Table II, the average film thickness in angstroms is set forth for Examples 1–10. The film thicknesses for Examples 1–6 and 9–10 are less than 1,000 angstrom while the films for Examples 7 and 8 are more than 1,000 angstroms. The devices of Examples 1–6 and 9–10 performed in a very satisfactory manner in providing optical displays while the device of Examples 7 and 8 did not perform satisfactorily. The devices in Examples 7 and 8 provided optical displays which were not clear. The films in Examples 7 and 8 were too thick to permit optimum between the magnetically active films.

While other modifications of the invention and variation thereof which may be employed within the scope of he invention have not been described, the invention is intended to include such as may be embraced in the following claims.

What we claim as new and desire to secure by Letters Patent of the United States is:

1. A magneto optical display device comprising
   (a) an electricallly insulating substrate having a nickel-chromium alloy adhered thereto, and a gold layer secured to the nickel-chromium alloy,
   (b) a nickel-iron magnetic film having a thickness of from about 15,000 angstroms to 100,000 angstroms secured to the gold layer of (a) which nickel-iron-magnetic film has a coating of polytetrafluoroethylene of less than 1,000 angstroms in thickness which is secured to the nickel-iron magnetic films, and
   (c) an aqueous stabilized suspension of magnetite iron oxide in contact with the polytetrafluoroethylene coating of (b) which is in a sealed container having a transparent insulating cover.

References Cited

UNITED STATES PATENTS

| | | | |
|---|---|---|---|
| 3,247,473 | 4/1966 | Allen | 29—195 X |
| 3,252,722 | 5/1966 | Allen | 29—195 X |
| 3,305,327 | 2/1967 | Schmeckenberger | 29—195 |
| 3,324,280 | 6/1967 | Cheney | 29—195 X |
| 3,343,145 | 9/1967 | Bertelsen | 29—195 X |
| 3,396,047 | 8/1968 | Prosen | 29—195 X |

HYLAND BIZOT, Primary Examiner

U.S. Cl. X.R.

29—191, 194, 195, 199